United States Patent
Hara et al.

(10) Patent No.: US 9,417,688 B2
(45) Date of Patent: Aug. 16, 2016

(54) MEASUREMENT METHOD, MEASUREMENT DEVICE, PROJECTION APPARATUS, AND COMPUTER-READABLE RECORDING MEDIUM

(71) Applicants: Junichi Hara, Kanagawa (JP); Kei Oyamada, Kanagawa (JP); Taeko Ishizu, Kanagawa (JP)

(72) Inventors: Junichi Hara, Kanagawa (JP); Kei Oyamada, Kanagawa (JP); Taeko Ishizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 36 days.

(21) Appl. No.: 14/601,410

(22) Filed: Jan. 21, 2015

(65) Prior Publication Data

US 2015/0213309 A1 Jul. 30, 2015

(30) Foreign Application Priority Data

Jan. 29, 2014 (JP) ................................. 2014-014837

(51) Int. Cl.
| | |
|---|---|
| G09G 5/00 | (2006.01) |
| G06F 3/00 | (2006.01) |
| G06F 3/01 | (2006.01) |
| G01B 11/00 | (2006.01) |
| G01B 11/25 | (2006.01) |

(52) U.S. Cl.
CPC .............. *G06F 3/005* (2013.01); *G01B 11/002* (2013.01); *G01B 11/2509* (2013.01); *G06F 3/017* (2013.01); *G06K 2209/401* (2013.01)

(58) Field of Classification Search
CPC ......... G06F 3/005; G06F 3/017; G01B 11/00; G01B 11/002; G01B 11/14; G01S 17/42; G03B 21/28; G06K 9/00; G06K 9/20; G06K 2209/401
See application file for complete search history.

(56) References Cited

U.S. PATENT DOCUMENTS

| | | | | |
|---|---|---|---|---|
| 5,495,337 A | * | 2/1996 | Goshorn | G01R 31/309 348/126 |
| 5,502,434 A | * | 3/1996 | Minowa | G08B 17/103 250/574 |
| 5,764,786 A | | 6/1998 | Kuwashima et al. | |
| 6,049,385 A | | 4/2000 | Norita et al. | |
| 8,508,376 B2 | * | 8/2013 | Knox | G01N 21/49 340/628 |
| 2005/0117045 A1 | * | 6/2005 | Abdellatif | H04N 5/2254 348/335 |

(Continued)

FOREIGN PATENT DOCUMENTS

| | | |
|---|---|---|
| JP | 07-114642 | 5/1995 |
| JP | 09-325018 | 12/1997 |
| JP | 2010-085973 | 4/2010 |

*Primary Examiner* — Joe H Cheng
(74) *Attorney, Agent, or Firm* — Oblon, McClelland, Maier & Neustadt, L.L.P

(57) ABSTRACT

A measurement device includes an image capturing unit which includes a photoelectric unit and captures multiple images corresponding to different photoelectric areas of the photoelectric unit, multiple reflecting units arranged at different positions and configured to reflect light traveling from a projection area, changing units which change image capture angles of the reflecting units, a light condensing unit which condenses the light reflected off the different reflecting units to the different photoelectric areas, an obtaining unit which obtains the captured images corresponding to the photoelectric areas and corresponding image capture angles of the reflecting units, a selection unit which selects, from the captured images, two or more images in each of which a measurement subject is captured, and a calculation unit which calculates a position of the measurement subject in a 3D space from the selected captured images and the image capture angles corresponding to the captured images.

15 Claims, 13 Drawing Sheets

(56) References Cited

U.S. PATENT DOCUMENTS

| | | | |
|---|---|---|---|
| 2005/0170332 A1* | 8/2005 | Shimamoto | G01N 21/6452 435/4 |
| 2006/0023109 A1* | 2/2006 | Mabuchi | H01L 24/17 348/340 |
| 2007/0216797 A1* | 9/2007 | Yoshida | G06K 9/00033 348/370 |
| 2010/0053737 A1 | 3/2010 | Fujita et al. | |
| 2010/0245647 A1* | 9/2010 | Honda | H01L 27/14634 348/308 |
| 2012/0127542 A1* | 5/2012 | Okada | H04N 1/40056 358/474 |
| 2013/0148184 A1* | 6/2013 | Azuma | G02B 21/08 359/223.1 |
| 2014/0022357 A1* | 1/2014 | Yu | H04N 13/02 348/48 |
| 2014/0036143 A1* | 2/2014 | Katashiba | H04N 5/2254 348/369 |
| 2015/0092019 A1* | 4/2015 | Asano | G01C 3/085 348/46 |

* cited by examiner

MEASUREMENT METHOD, MEASUREMENT DEVICE, PROJECTION APPARATUS, AND COMPUTER-READABLE RECORDING MEDIUM

CROSS-REFERENCE TO RELATED APPLICATIONS

The present application claims priority to and incorporates by reference the entire contents of Japanese Patent Application No. 2014-014837 filed in Japan on Jan. 29, 2014.

BACKGROUND OF THE INVENTION

1. Field of the Invention

The presently described embodiments relate generally to a measurement method, a measurement device, a projection apparatus, and a computer-readable recording medium having a computer program.

2. Description of the Related Art

A method for controlling a device using a recognition result of a gesture of a hand or the like in a 3D (three-dimensional) space rather than directly manipulating a button or the like of the device is known. More specifically, a technique for controlling a device by measuring a position of a measurement subject, such as a hand, in a 3D space utilizing captured images obtained by capturing a gesture of the measurement subject with a camera is known. Examples of the technique are disclosed in Japanese Laid-open Patent Publication Nos. 7-114642 and 9-325018.

As is conventionally known, such a measurement device may be mounted on a projection apparatus (e.g., a projector) which projects a projection image. Such a projection apparatus on which a measurement device is mounted is conventionally placed rather away from a projection surface and controlled in accordance with a measurement result of a position of user's hand or the like which is near the projection surface in a 3D space.

Meanwhile, a projection apparatus projecting a projection image obliquely toward a projection surface to achieve large-screen projection with a short throw is known. One type of such a projection apparatus uses a short-focal-length lens as its projection lens. This type of projection apparatus is advantageously capable of projecting a projection image favorably even in a small room or the like because the apparatus can be placed close to a projection surface.

However, conventional measurement devices are disadvantageously not mountable on a projection apparatus which employs a short-focal-length lens as its projection lens. This is because the conventional measurement device needs to be placed away from a projection surface so that the device can measure a position of a measurement subject.

In light of the foregoing, there is a need for a measurement device mountable on a projection apparatus which employs a short-focal-length lens as its projection lens, the projection apparatus including the measurement device, a measurement method, and a computer-readable recording medium having a computer program.

It is an object of the present invention to at least partially solve the problem in the conventional technology.

SUMMARY OF THE INVENTION

It is an object of the present invention to at least partially solve the problems in the conventional technology.

According to the present invention, there is provided a measurement device comprising: an image capturing unit including a photoelectric unit and configured to capture multiple images corresponding to respective multiple different photoelectric areas of the photoelectric unit, the photoelectric unit photoelectrically converting incident light; multiple reflecting units arranged at different positions, each of the reflecting units being positioned to reflect light traveling from a projection area between a projection surface, on which a projection image is to be projected, and the measurement device off a reflecting surface of the reflecting unit; changing units, each of the changing units being provided for one reflecting unit of the multiple reflecting units and configured to change an image capture angle of the one reflecting unit; a light condensing unit configured to condense each of reflected light beams reflected off the different reflecting units to a corresponding one of the different photoelectric areas of the photoelectric unit; an obtaining unit configured to obtain the multiple captured images corresponding to the respective multiple photoelectric areas and image capture angles of the reflecting units, each of the image capture angles being an angle at which one of the captured images is captured; a selection unit configured to select, from the multiple captured images, two or more images in each of which a measurement subject is captured; and a calculation unit configured to calculate a position of the measurement subject in a 3D space based on the selected two or more captured images and the image capture angles corresponding to the respective two or more captured images.

The present invention also provides a projection apparatus comprising: the above-mentioned measurement device; and a projection unit configured to project the projection image on the projection area.

The present invention also provides a measurement method to be performed by a measurement device including an image capturing unit including a photoelectric unit and configured to capture multiple images corresponding to respective multiple different photoelectric areas of the photoelectric unit, the photoelectric unit photoelectrically converting incident light, multiple reflecting units arranged at different positions, each of the reflecting units being positioned to reflect light traveling from a projection area between a projection surface, on which a projection image is to be projected, and the measurement device, changing units, each of the changing units being provided for one reflecting unit of the multiple reflecting units and configured to change an image capture angle of the one reflecting unit, and a light condensing unit configured to condense each of reflected light beams reflected off the different reflecting units to a corresponding one of the different photoelectric areas of the photoelectric unit, the measurement method comprising: obtaining the multiple captured images corresponding to the respective multiple photoelectric areas and image capture angles of the reflecting units, each of the image capture angles being an angle at which one of the captured images is captured; selecting, from the multiple captured images, two or more images in each of which a measurement subject is captured; and calculating a position of the measurement subject in a 3D space based on the selected two or more captured images and the image capture angles corresponding to the respective two or more captured images.

The present invention also provides a non-transitory computer-readable recording medium storing program instructions that, when executed by a computer including an image capturing unit including a photoelectric unit and configured to capture multiple images corresponding to respective multiple different photoelectric areas of the photoelectric unit, the photoelectric unit photoelectrically converting incident light, multiple reflecting units arranged at different positions, each of the reflecting units being positioned to reflect light traveling from a projection area between a projection surface, on which a projection image is to be projected, and the image capturing unit, changing units, each of the changing units being provided for one reflecting unit of the multiple reflecting units and configured to change an image capture angle of the one reflecting unit, and a light condensing unit configured to condense each of reflected light beams reflected off the different reflecting units to a corresponding one of the different photoelectric areas of the photoelectric unit, cause the computer to perform: obtaining the multiple captured images corresponding to the respective multiple photoelectric areas and image capture angles of the reflecting units, each of the image capture angles being an angle at which one of the captured images is captured; selecting, from the multiple captured images, two or more images in each of which a measurement subject is captured; and calculating a position of the measurement subject in a 3D space based on the selected two or more captured images and the image capture angles corresponding to the respective two or more captured images.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
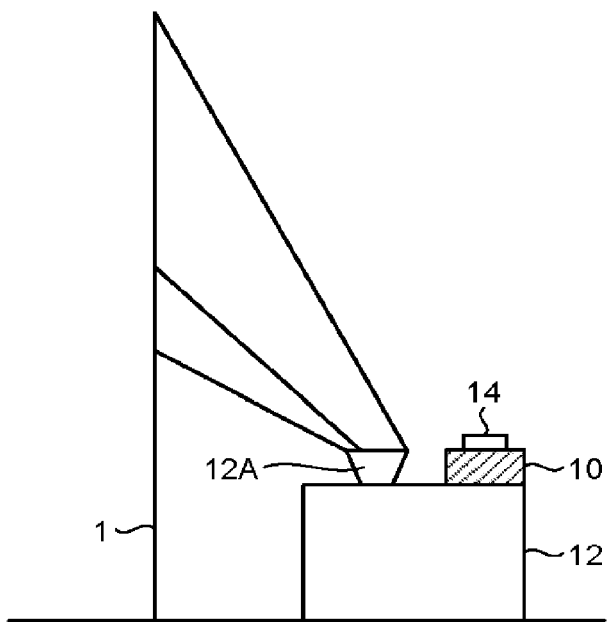
FIG. 1 is an explanatory diagram of a measurement device according to an embodiment of the present invention.

FIG. 1 is an explanatory diagram of a measurement device 10 according to an embodiment of the present invention. As illustrated in FIG. 1, the measurement device 10 according to the embodiment is mounted on a projection apparatus 12.

The projection apparatus 12 is a short-throw projector which employs a short-focal-length lens as a projection unit 12A. The projection apparatus 12 obliquely projects a projection image fed from an information processing apparatus such as a PC (personal computer) toward a projection surface 1 at a short projection distance. Referring to the example illustrated in FIG. 1, the projection apparatus 12 is installed on a floor and projects a projection image on the projection surface 1 by projecting the projection image obliquely upward.

The measurement device 10 is mounted on the projection apparatus 12. The measurement device 10 is a device which measures a position of a measurement subject in a 3D space. Examples of the measurement subject include, but are not limited to, a part (e.g., a hand, an arm, or a finger) of a human body and a pointing member such as a stylus pen.

The measurement device 10 includes an image obtaining mechanism 14. The image obtaining mechanism 14 is a mechanism for obtaining a captured image where an area containing at least a projection area between the projection surface 1 and the measurement device 10 is captured.

Figure 2:
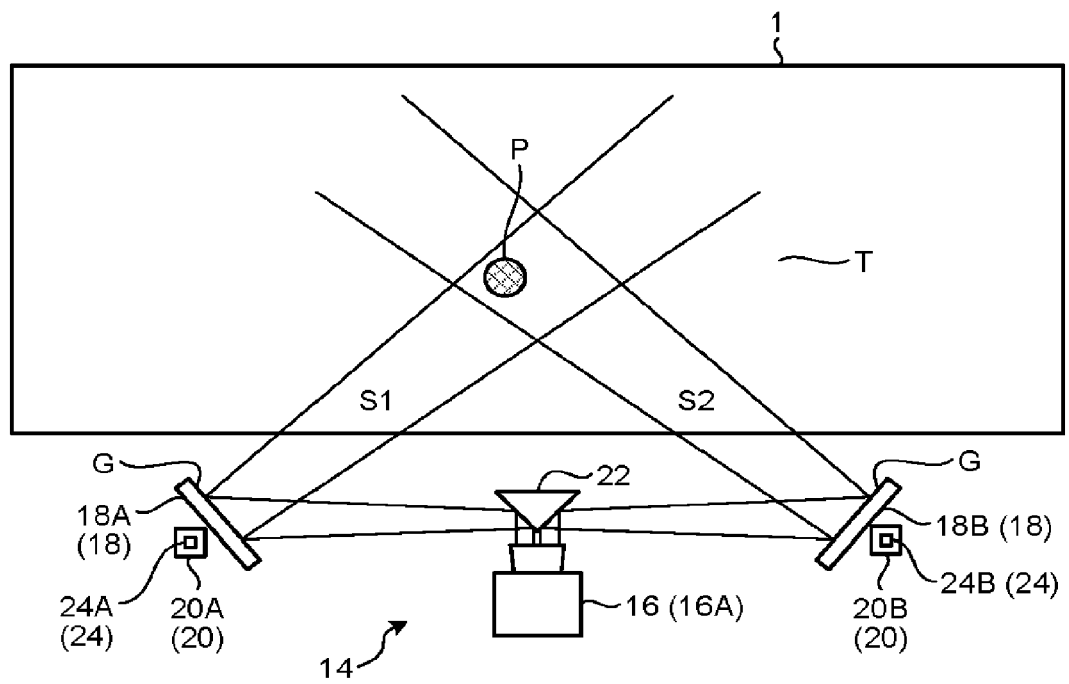
FIG. 2 is a schematic diagram of an image obtaining mechanism of the embodiment.

FIG. 2 is a diagram illustrating the image obtaining mechanism 14. More specifically, FIG. 2 is a schematic diagram of the image obtaining mechanism 14 as viewed toward the projection surface 1 or, in other words, as viewed from a front side (i.e., the side facing the projection surface 1) of the projection surface 1.

The image obtaining mechanism 14 includes an image capturing unit 16, multiple reflecting units 18, multiple changing units 20, and a light condensing unit 22.

The image capturing unit 16 includes a photoelectric unit which photoelectrically converts incident light. The photoelectric unit may be made up of, for example, multiple CCDs (charge coupled devices) arranged in a matrix. The image capturing unit 16 captures multiple images corresponding to respective multiple different photoelectric areas of the photoelectric unit. Accordingly, the image capturing unit 16 is configured to be capable of simultaneously capturing multiple images of a measurement subject from different directions.

Figure 3:
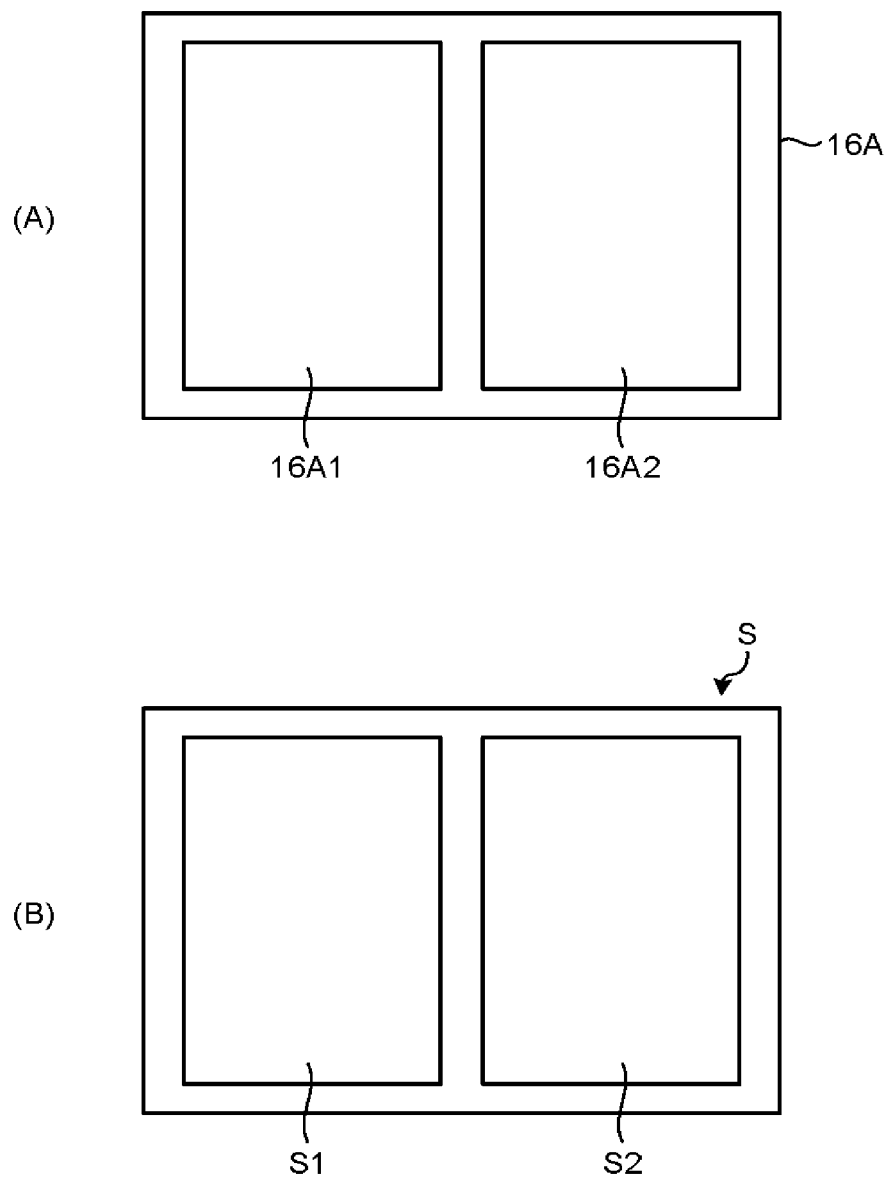
FIG. 3 that includes parts (A) and (B) is explanatory diagram of a photoelectric unit of the embodiment and captured images.

FIG. 3 is explanatory diagram of a photoelectric unit 16A and captured images S. As illustrated in part (A) of FIG. 3, the photoelectric unit 16A is divided into multiple photoelectric areas in advance. Each of the photoelectric areas is an area for receiving light reflected off a corresponding one of the multiple reflecting units 18. Accordingly, the number of the photoelectric areas, into which the photoelectric unit 16A is divided in advance, corresponds to the number of the reflecting units 18 (more specifically, the number of reflecting surfaces of the reflecting units 18).

The photoelectric unit 16A according to the embodiment has two photoelectric areas, which are a photoelectric area 16A1 and a photoelectric area 16A2, as the multiple photoelectric areas. The image capturing unit 16 therefore performs image capture to obtain a captured image S1 and a captured image S2 which correspond to the photoelectric area 16A1 and the photoelectric area 16A2, respectively, as the captured images S. Hereinafter, the photoelectric area 16A1 and/or the photoelectric area 16A2 may be referred to representatively as the "photoelectric area(s)". The captured image S1 and/or the captured image S2 may be referred to representatively as the "captured image(s) S".

In the embodiment, it is assumed that the photoelectric unit 16A includes the two photoelectric areas (the photoelectric area 16A1 and the photoelectric area 16A2). However, the number of the photoelectric areas included in the photoelectric unit 16A is not limited to two but can be any number corresponding to the number of the reflecting units 18.

Referring back to FIG. 2, the reflecting units 18 are arranged at positions where the reflecting units 18 can reflect at least light traveling from a projection area T. In the embodiment, it is assumed that the photoelectric unit 16A includes two reflecting units (a reflecting unit 18A and a reflecting unit 18B) as the multiple reflecting units 18. Hereinafter, the reflecting unit 18A and/or the reflecting unit 18B may be referred to representatively as the "reflecting unit(s) 18". The reflecting unit 18A and the reflecting unit 18B are arranged at different positions. The number of the reflecting units 18 is not limited to two but can be any number larger than one.

Now, assume a virtual vertical plane orthogonal to the projection surface 1 and extending through the image capturing unit 16 in a 3D space. In the embodiment, the reflecting unit 18A is placed on one side relative to the virtual vertical plane in the 3D space. The reflecting unit 18B is placed on the other side relative to the virtual vertical plane in the 3D space. However, arrangement of the reflecting units 18A and 18B is not limited to this arrangement.

The reflecting unit 18 includes a reflecting surface G that reflects light, examples of which include light reflected off an image-capture subject such as an object placed in the 3D space and light emitted from the image-capture subject. Put another way, the reflecting surface G of the reflecting unit 18 specularly reflects light in the 3D space. The reflecting surface G thus causes an image of the image-capture subject in the 3D space to enter the image capturing unit 16 via the light condensing unit 22. The reflecting surface G can be obtained by mirror finishing, for example.

Figure 4:
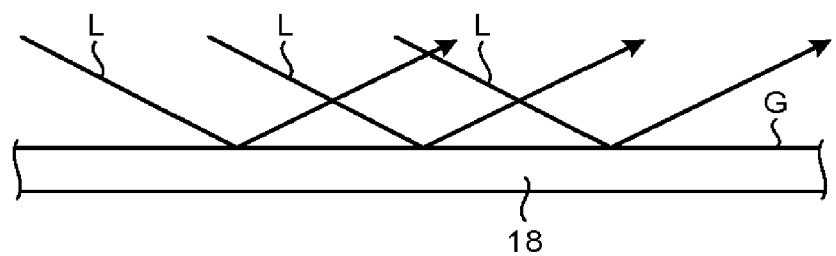
FIG. 4 is an explanatory diagram of a reflecting surface of a reflecting unit of the embodiment.

FIG. 4 is an explanatory diagram of the reflecting surface G of the reflecting unit 18. In the embodiment, it is assumed that the reflecting surfaces G are flat to regularly reflect incident light (see light beams L in FIG. 4).

Referring back to FIG. 2, the light condensing unit 22 condenses each of reflected light beams reflected off the different reflecting units 18 to a corresponding one of the different photoelectric areas (the photoelectric area 16A1 or the photoelectric area 16A2) of the photoelectric unit 16A. The image capturing unit 16 performs image capture to obtain the captured image S1 and the captured image S2 corresponding to the photoelectric area 16A1 and the photoelectric area 16A2, respectively, as the captured images S.

The changing unit 20 changes an image capture angle of the reflecting unit 18. The image capture angle is an angle between the normal to the reflecting surface G of the reflecting unit 18 and a light-receiving surface of the photoelectric unit 16A of the image capturing unit 16. When the projection apparatus 12 is placed on the floor (FIG. 1), the light-receiving surface of the photoelectric unit 16A of the image capturing unit 16 is adjusted in advance to be parallel to the horizontal direction.

The changing unit 20 may change the image capture angle of the reflecting unit 18 periodically. Alternatively, the changing unit 20 may change the image capture angle of the reflecting unit 18 in a manner to trace an image-capture subject. To change the image capture angle so as to trace an image-capture subject, it may be preferable that the measurement device 10 includes a known sensor for detecting a direction of the image-capture subject to change the image capture angle so that the reflecting unit 18 is oriented toward the detected direction.

The changing units 20 are provided in such a manner that each of the multiple reflecting units 18 includes one of the changing units 20. In the embodiment, the measurement device 10 includes a changing unit 20A for the reflecting unit 18A and a changing unit 20B for the reflecting unit 18B as the multiple changing units 20. Hereinafter, the changing unit 20A and/or the changing unit 20B may be referred to representatively as the "changing unit(s) 20".

The changing unit 20 includes a drive unit 24. The drive unit 24 drives the reflecting unit 18. The drive unit 24 drives the reflecting unit 18, thereby periodically changing the image capture angle of the reflecting unit 18.

In the embodiment, the measurement device 10 includes, as the drive units 24, a drive unit 24A which drives the reflecting unit 18A and a drive unit 24B which drives the reflecting unit 18B. Hereinafter, the drive unit 24A and/or the drive unit 24B may be referred to representatively as the "drive unit(s) 24".

Figure 5:
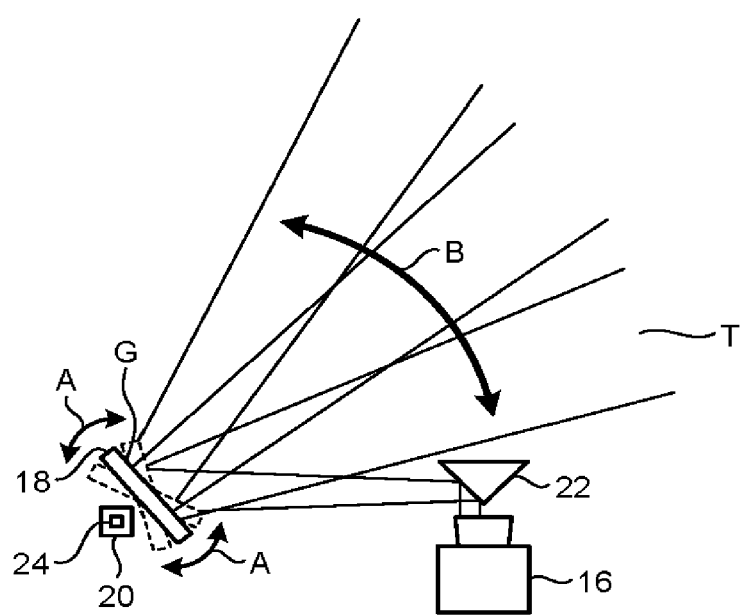
FIG. 5 is an explanatory diagram of how a changing unit of the embodiment changes an image capture angle.

FIG. 5 is an explanatory diagram of how the changing unit 20 changes the image capture angle. For example, the changing unit 20 may change the image capture angle by periodically changing an image capture direction in a manner to sweep a space in front of the projection surface 1. The image capture direction is the direction which the reflecting surface G of the reflecting unit 18 is facing.

In the example illustrated in FIG. 5, the changing unit 20 causes the reflecting unit 18 to periodically pivot in the directions indicated by arrows A in FIG. 5, thereby periodically changing the image capture direction (in the directions indicated by arrow B in FIG. 5). The reflecting unit 18 is configured to be pivotable at least from a state where the reflecting surface G is oriented (in the embodiment, in the horizontal direction) orthogonal to the projection surface 1 toward a state where the reflecting surface G faces the light condensing unit 22, and vice versa. For example, the reflecting unit 18 may be configured to be pivotable within a range from 30 to 60 degrees of the angle (the image capture angle) of the reflecting unit 18. The angle range of the reflecting unit 18 is not limited to from 30 to 60 degrees but may be changed as appropriate.

In the embodiment, a virtual version of the projection surface 1 on which the projection unit 12A of the projection apparatus 12 projects a projection image is estimated in advance. Positions of the units of the image obtaining mechanism 14 and the pivoting direction of the reflecting units 18 are pre-adjusted to satisfy the above condition.

The measurement device 10 uses the virtual projection surface 1 in calculations for a variety of processes, which will be described later, in which the projection surface 1 is involved.

As described earlier, light beams reflected off the reflecting units 18 are condensed through the light condensing unit 22 to the photoelectric areas 16A1, 16A2 of the photoelectric unit 16A of the image capturing unit 16. Accordingly, the image capturing unit 16 is capable of capturing multiple images corresponding to the respective image capture angles of the reflecting units 18.

Figure 6:
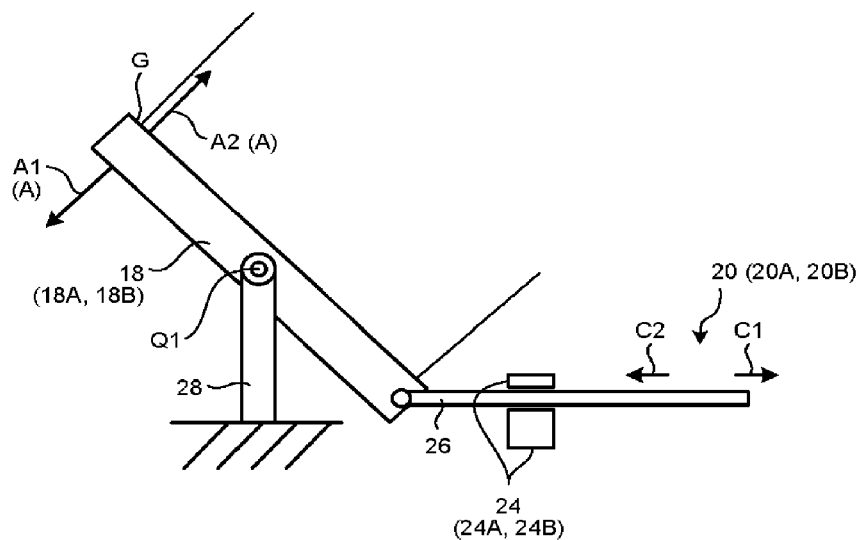
FIG. 6 is an explanatory diagram of a mechanism by which the changing unit changes an image capture angle.

FIG. 6 is an explanatory diagram of the mechanism for changing the image capture angle. In the embodiment, the changing unit 20 includes a support 28, the drive unit 24, and a bar member 26.

The support 28 supports the reflecting unit 18 in a manner that allows the reflecting unit 18 to pivot in directions (the directions indicated by the arrows A (A1 and A2)) intersecting the reflecting surface G. In the embodiment, the support 28 supports the reflecting unit 18 at a position where the reflecting unit 18 can pivot on a pivot axis extending parallel to the reflecting surface G through a center Q1 in the longitudinal direction of the reflecting surface G. However, the pivot axis of the reflecting unit 18 does not necessarily pass through the center Q1 of the reflecting surface G.

The bar member 26 is attached to one end, in the direction along the reflecting surface G, of the reflecting unit 18. The bar member 26 supports the reflecting unit 18 at the one end in a manner that allows the reflecting unit 18 to pivot. The bar member 26 is configured to be movable toward (in the direction indicated by arrow C2 in FIG. 6) the support 28 and away (in the direction indicated by arrow C1 in FIG. 6) from the support 28. The drive unit 24 drives the bar member 26 so that the bar member 26 periodically moves in the directions indicated by the arrows C1 and C2. By driving the bar member 26 in this manner, the drive unit 24 causes the reflecting unit 18 to periodically pivot in the directions (the directions indicated by the arrows A1, A2 in FIG. 8) intersecting the reflecting surface G.

Figure 7:
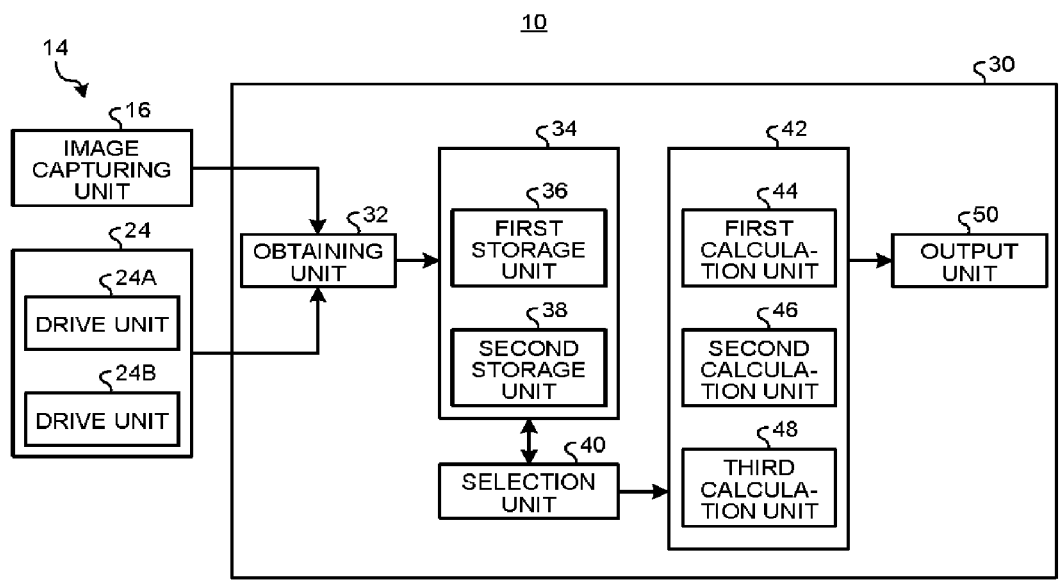
FIG. 7 is a functional block diagram of a measurement device of the embodiment.

FIG. 7 is a functional block diagram of the measurement device 10.

The measurement device 10 includes the image obtaining mechanism 14 and a control unit 30. The control unit 30 is electrically connected to the image obtaining mechanism 14 (the image capturing unit 16, and the drive unit 24 of the changing units 20) and the projection apparatus 12 (which is not shown in FIG. 7).

When a power switch (not shown) of the measurement device 10 is turned on to supply power, the changing unit 20 of the image obtaining mechanism 14 starts driving the reflecting unit 18, thereby starting periodically changing the image capture angle. The drive unit 24 of the changing unit 20 has a clock mechanism and sequentially transmits, to the control unit 30, time data indicating time provided by the clock mechanism and information indicating an image capture angle of the reflecting unit 18 at the time indicated by the time data.

The time data can be any information which allows specifying when captured images are captured in time series. The time data may be, for example, date/time, year/date/time, or time elapsed since power supply to the measurement device 10 is started.

When the power switch (not shown) of the measurement device 10 is turned on to supply power, the image capturing unit 16 starts image capture. The image capturing unit 16 has a clock mechanism and sequentially transmits, to the control unit 30, time data indicating time provided by the clock mechanism and the captured images S which are captured at the time indicated by the time data. The clock mechanism included in the image capturing unit 16 and that in the drive unit 24 are to be adjusted to indicate same time.

The control unit 30, which is a computer including a CPU (central processing unit) and the like, provides overall control of the measurement device 10. The control unit 30 may alternatively be embodied in circuitry or the like other than a CPU.

The control unit 30 includes an obtaining unit 32, a storage unit 34, a selection unit 40, a calculation unit 42, and an output unit 50. A part of or all of the obtaining unit 32, the calculation unit 42, and the output unit 50 may be implemented by causing, for example, a processing device such as a CPU to execute program instructions or, in short, in software. Alternatively, the same may be implemented in hardware such as an IC (integrated circuit) or a combination of software and hardware.

The obtaining unit 32 obtains the multiple captured images S, which correspond to the respective multiple photoelectric areas, and image capture angles of the reflecting units 18 at each of which one of the multiple captured images S is captured.

More specifically, the obtaining unit 32 obtains, from the image capturing unit 16, the captured images S (the captured image S1 and the captured image S2) and time data indicating the time at which the captured images S are captured. The obtaining unit 32 also obtains time data indicating the time and image capture angles corresponding to the time from the drive unit 24. The obtaining unit 32 thus obtains the multiple simultaneously-captured images S (the captured image S1 and the captured image S2) and the image capture angles, at each of which one of the captured images S is captured, of the reflecting units 18.

The storage unit 34 stores various types of information. The storage unit 34 may be an external memory, such as an HDD, or an internal memory. The storage unit 34 includes a first storage unit 36 and a second storage unit 38. The first storage unit 36 stores the image angles and the time data indicating time corresponding to the respective image angles. The second storage unit 38 stores the captured images S and the time data indicating the time at which the respective captured images S are captured.

The selection unit 40 selects at least two images, in each of which a measurement subject P is captured, from the captured images S that are simultaneously captured. The number of the images to be selected from the captured images S by the selection unit 40 can be any number larger than one (in other words, any number no less than two). In the embodiment, an example in which the number of the captured images S to be selected by the selection unit 40 is two is described.

More specifically, the selection unit 40 makes determination sequentially on the captured images S stored in the storage unit 34 in a first-captured, first-subjected-to-determination manner. The selection unit 40 selects the two captured images S, in each of which the measurement subject P is captured, from a group of the multiple captured images S captured at an earliest time and stored in the storage unit 34. If no group of the multiple captured images S captured at a same time includes the two captured images S both containing the measurement subject P, the selection unit 40 deletes time data indicating the time, the captured images S captured at the time, and image capture angles corresponding to the time from the storage unit 34. The selection unit 40 sequentially makes the determination on each group of simultaneously-captured images of the multiple captured images S in time sequence, and repeats this series of operations including deletion and making the determination until the two captured images S, in each of which the measurement subject P, is captured are successfully selected.

In the embodiment, the image capturing unit 16 captures the two captured images S (the captured image S1 and the captured image S2) as the captured images S. Accordingly, in the embodiment, the selection unit 40 selects the captured image S1 and the captured image S2 both containing the measurement subject P.

Figure 8:
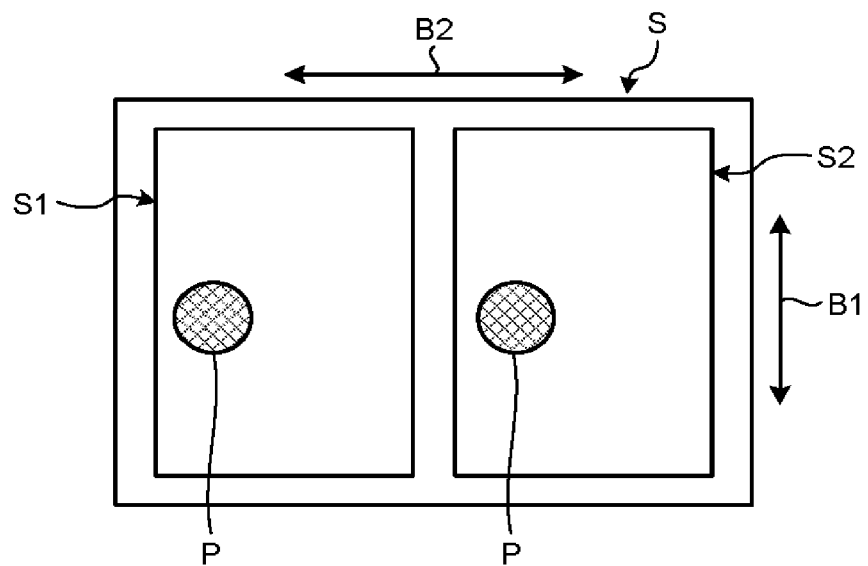
FIG. 8 is an explanatory diagram of captured images each containing a measurement subject in the embodiment.

FIG. 8 is an explanatory diagram of the captured images S each containing the measurement subject P. As illustrated in FIG. 8, each of the two captured images S (the captured image S1 and the captured image S2) selected by the selection unit 40 contains the measurement subject P. In the example illustrated in FIG. 8, the top side in the vertical direction (the direction indicated by arrow B1 in FIG. 8) in FIG. 8 is the far side (the side away from the measurement device 10). The bottom side in the vertical direction (in the direction indicated by the arrow B1 in FIG. 8) is the near side (the side of the measurement device 10). FIG. 8 illustrates an example of the captured images S in which both the image capture angle of the reflecting unit 18A and that of the reflecting unit 18B are 45 degrees.

Referring back to FIG. 7, when the image capturing unit 16 is configured to capture three or more images as the captured images S, the selection unit 40 may select the two captured images S from the three or more images.

The selection unit 40 selects the captured image S containing the measurement subject P by determining whether or not the measurement subject P is present in the captured image S. A known image processing method can be used in determination of presence of the measurement subject P.

The selection unit 40 outputs the selected two captured images S and image capture angles, at each of which one of the captured images S is captured, to the calculation unit 42. The selection unit 40 deletes time data indicating time at which the captured images S output to the calculation unit 42 are captured (hereinafter, the "time corresponding to the captured images S"), the captured images S captured at the time (hereinafter, the "captured images corresponding to the time"), and the image capture angles corresponding to the time from the storage unit 34. The selection unit 40 may perform this deletion after the two captured images S are selected and before the captured images S are output to the calculation unit 42.

The calculation unit 42 calculates the position of the measurement subject P in the 3D space from the two captured images S selected by the selection unit 40 and the image capture angles corresponding to the respective two captured images S.

The calculation unit 42 can calculate more accurately the position of the measurement subject P in the 3D space by obtaining multiple calculated values from the two captured images S selected by the selection unit 40 and the image capture angles corresponding to the respective two captured images S and using mean values, statistically estimated values, and the like of the calculated values.

In the embodiment, the calculation unit 42 includes a first calculation unit 44, a second calculation unit 46, and a third calculation unit 48.

The first calculation unit 44 calculates a 2D (two-dimensional) measurement area 60 (see FIG. 9) corresponding to the two captured images S selected by the selection unit 40 in the real space (actual 3D space) from the image capture angles corresponding to the respective two captured images S. The measurement area 60 is an area belonging to the projection area T (FIG. 2) in the 3D space and captured in each of the two captured images S (the captured image SL and the captured image S2). The measurement area 60 is a two-dimensional area which passes through the position in the real space of the measurement subject P, which is contained in the captured images S, in a direction parallel to the projection surface 1.

In the embodiment, as described earlier, the reflecting unit 18 is configured to be pivotable from the state where the reflecting unit 18 lies horizontally toward the state where the reflecting surface G faces the light condensing unit 22, and vice versa in the range from 30 to 60 degrees of the image capture angle. Accordingly, the position of the measurement subject P in the 2D plane that is in front of the projection surface 1 (in other words, on the side of the measurement device 10 with respect to the projection surface 1) and parallel to the projection surface 1 is obtained as the position in the measurement area 60 calculated by the first calculation unit 44.

Motion of the measurement subject P in a plane orthogonal to the projection surface 1 is captured as a motion trajectory in the lateral direction in FIG. 8 (the direction indicated by arrow B2 in FIG. 8) in each of the captured images S (the captured image S1 and the captured image S2) illustrated in FIG. 8. The position of the measurement subject P in the direction of the gravity is indicated as a position (which is common between the captured image S1 and the captured image S2) in the vertical direction (the direction indicated by the arrow B2 in FIG. 8) in each of the captured images S.

Figure 9:
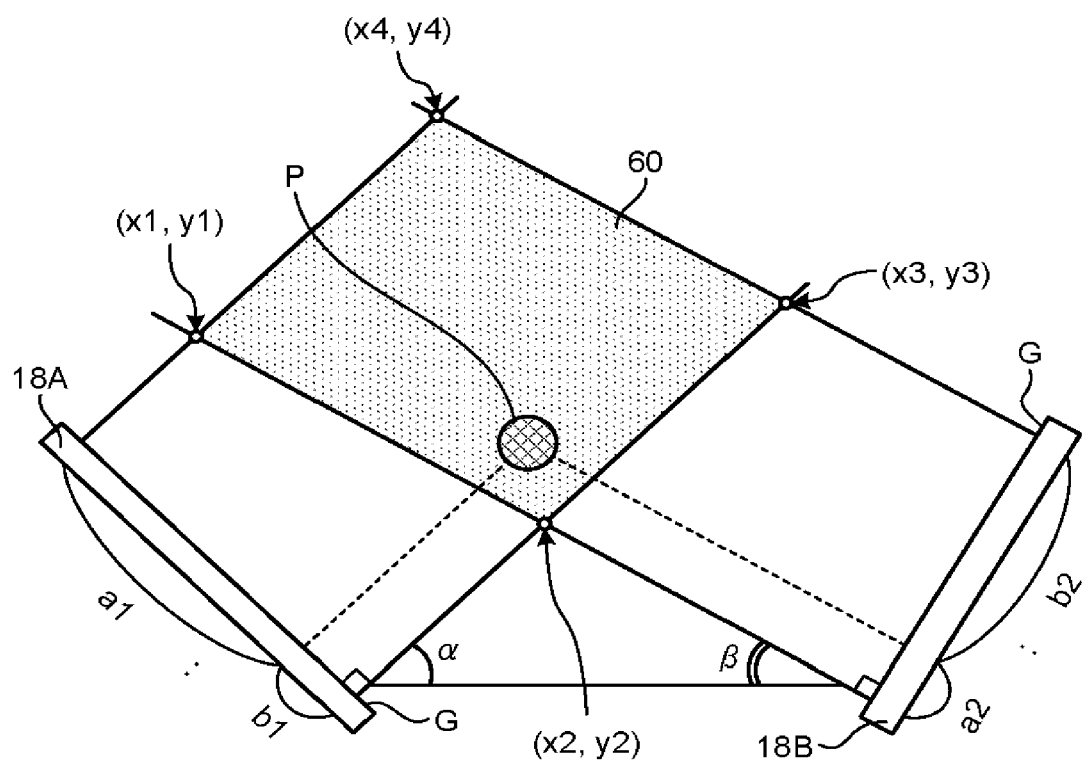
FIG. 9 is an explanatory diagram of a measurement area in the embodiment.

FIG. 9 is an explanatory diagram of the measurement area 60. Assume that, for instance, the captured image S1 which is one of the two captured images S selected by the selection unit 40 is captured when the image capture angle of the image capture direction of the reflecting unit 18A is $\alpha$. Further assume that the captured image S2 which is the other one of the two captured images S is captured when the image capture angle of the image capture direction of the reflecting unit 18B is $\beta$.

In this case, the first calculation unit 44 calculates equations of straight lines expressing boundaries of a 2D image-capture area corresponding to the captured image S in the real space from the image capture angle $\alpha$ of the image capture direction of the reflecting unit 18A and the image capture angle $\beta$ of the image capture direction of the reflecting unit 18B.

As described earlier, the image capture angle is the angle between the normal to the reflecting surface G of the reflecting unit 18 and the light-receiving surface (which lies horizontally in the embodiment) of the photoelectric unit 16A of the image capturing unit 16. Accordingly, the image capture angle $\alpha$ is the angle between a horizontal straight line on the 2D plane parallel to the projection surface 1 and the normal to the reflecting surface G of the reflecting unit 18A. Similarly, the image capture angle $\beta$ is the angle between the horizontal straight line on the 2D plane parallel to the projection surface 1 and the normal to the reflecting surface G of the reflecting unit 18B.

Hence, the first calculation unit 44 calculates a relative position, which is defined by the image capture angle $\alpha$, of the reflecting surface G of the reflecting unit 18A in the real space from the image capture angle $\alpha$, and one end and the other end of an area, which is to be captured by being reflected off the reflecting unit 18A, of the measurement area 60 using equations expressing two straight lines orthogonally crossing the reflecting surface G of the reflecting unit 18A. The relative position, which depends on the image capture angle $\alpha$, of the reflecting surface G of the reflecting unit 18A in the real space may preferably be measured and stored in advance. However, the relative position is not necessarily measured and stored in advance (in other words, may be obtained through calculation).

Similarly, the first calculation unit 44 calculates a relative position, which is defined by the image capture angle $\beta$, of the reflecting surface G of the reflecting unit 18B in the real space from the image capture angle $\beta$, and one end and the other end of an area, which is to be captured by being reflected off the reflecting unit 18B, of the measurement area 60 using equations expressing two straight lines orthogonally crossing the reflecting surface G of the reflecting unit 18B. The relative position, which depends on the image capture angle β, of the reflecting surface G of the reflecting unit 18B in the real space may preferably be measured and stored in advance.

The first calculation unit 44 calculates an area surrounded by these four straight lines, thereby calculating the measurement area 60 (the rectangular area formed by connecting the four points: (x1,y1), (x2,y2), (x3,y3), and (x4,y4) in FIG. 9).

The second calculation unit 46 calculates a second position of the measurement subject P in the measurement area 60 from first positions of the measurement subject P in the respective two captured images S selected by the selection unit 40 and the image capture angles corresponding to the respective captured images S.

The second calculation unit 46 calculates a tenth position, which is the position on the reflecting surface G of the reflecting unit 18A to which the first position of the measurement subject P in the captured image S1 which is one of the two captured images S (the captured image S1 and the captured image S2) selected by the selection unit 40 is mapped, as described below. The second calculation unit 46 calculates the first position of the measurement subject P in the captured image S1 in the lateral direction (the direction indicated by the arrow B2 in FIG. 8). The first position is expressed by a ratio (a1:b1) between a lateral distance between the one end of the captured image S1 and the measurement subject P and a lateral distance between the other end and the measurement subject P. The second calculation unit 46 calculates the ratio expressing the first position as the tenth position (a1:b1) on the reflecting surface G of the reflecting unit 18A to which the first position of the measurement subject P in the captured image S1 is mapped.

Similarly, the second calculation unit 46 calculates the tenth position on the reflecting surface G of the reflecting unit 18B to which the first position of the measurement subject P in the captured image S2 which is the other one of the selected captured images S is mapped. The second calculation unit 46 calculates the first position of the measurement subject P in the captured image S2 in the lateral direction (the direction indicated by the arrow B2 in FIG. 8). The first position is expressed by a ratio (a2:b2) between a lateral distance between the one end of the captured image S2 and the measurement subject P and a lateral distance between the other end and the measurement subject P. The second calculation unit 46 calculates the ratio expressing the first position as the tenth position (a2:b2) on the reflecting surface G of the reflecting unit 18B to which the first position of the measurement subject P in the captured image S2 is mapped.

Figure 10:
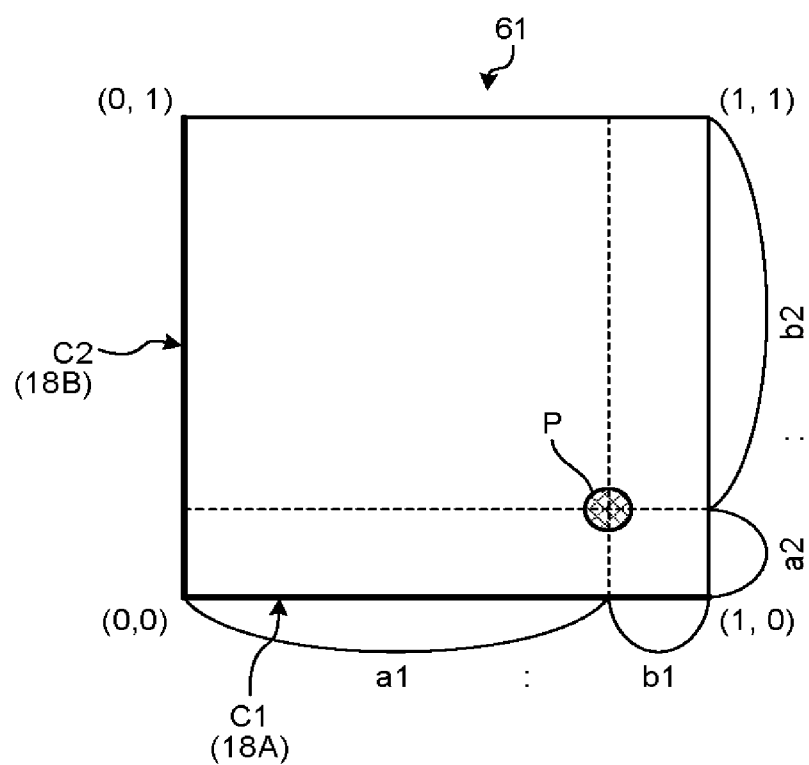
FIG. 10 is an explanatory diagram of how a second calculation unit of the embodiment calculates a tenth position.

FIG. 10 is an explanatory diagram of how the second calculation unit 46 calculates the tenth position. The second calculation unit 46 produces a unit rectangular area 61 by causing a C1 axis which lies along the reflecting surface G of the reflecting unit 18A and a C2 axis which lies along the reflecting surface G of the reflecting unit 18B to intersect orthogonally. The second calculation unit 46 maps the tenth position ((a1:b1), (a2:b2)) on the unit rectangular area 61. The second calculation unit 46 calculates the position to which the tenth position is mapped on the unit rectangular area 61 as the second position of the measurement subject P in the measurement area 60. More specifically, the second calculation unit 46 calculates the intersection point of the tenth position (a1:b1) along the C1 axis and the tenth position (a2:b2) along the C2 axis as the second position of the measurement subject P.

Referring back to FIG. 7, the third calculation unit 48 calculates the position of the measurement subject P in the 3D space from the second position and a third position. The third position is the position of the measurement subject P in the 3D space in the direction orthogonal to the measurement area 60. In other words, the third position is the position of the measurement subject P in the 3D space in the direction of the gravity (i.e., the height direction).

The third calculation unit 48 calculates the third position by calculating the position of the measurement subject P in any one of the captured image S1 and the captured image S2 selected by the selection unit 40 in the vertical direction (the direction indicated by the arrow B2 in FIG. 8).

The position in the vertical direction is expressed by a ratio between a distance between one end of the captured image S1 or the captured image S2 and the measurement subject P in the vertical direction (the direction indicated by the arrow B1 in FIG. 8) and a distance between the other end and the measurement subject P.

Thereafter, the third calculation unit 48 applies, to the unit rectangular area 61, an affine transformation to the measurement area 60. By the affine transformation, the third calculation unit 48 transforms the second position of the measurement subject P in the unit rectangular area 61 to a position in the two dimensional space passing through the real-space position of the measurement subject P contained in the captured images S in the projection area (FIG. 2) in the 3D space.

The third calculation unit 48 also maps the vertical position (the ratio) of the measurement subject P in the one of the captured image S1 and the captured image S2 selected by the selection unit 40 to the plane orthogonal to the measurement area 60 in the real space. Thus, the third calculation unit 48 calculates the position of the measurement subject P in the real space from the ratio expressing the position of the measurement subject P in the captured images S.

The third calculation unit 48 calculates the position of the measurement subject P in the 3D space as described above.

Referring back to FIG. 7, the calculation unit 42 outputs information indicating the position of the measurement subject P in the 3D space to the output unit 50. The output unit 50 outputs the information indicating the position of the measurement subject P in the 3D space to the projection apparatus 12.

The projection apparatus 12 can now provide various controls using the position of the measurement subject P in the 3D space measured while the projection image is being projected on the projection surface 1.

The measurement process performed by the measurement device 10 is described below.

Figure 11:
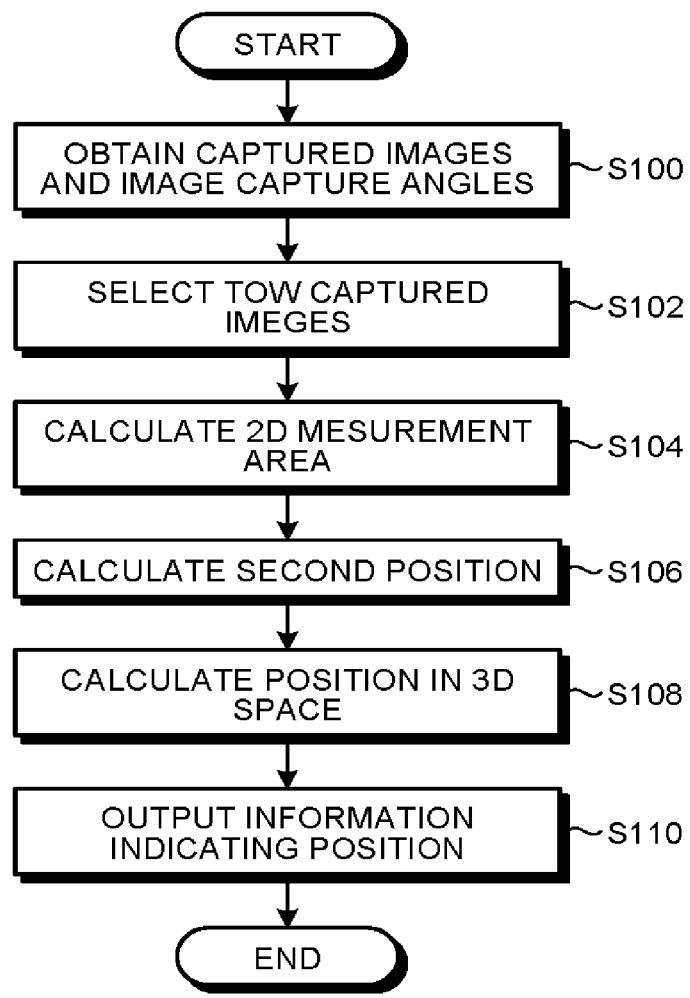
FIG. 11 is a flowchart illustrating a routine for a measurement process in the embodiment.

FIG. 11 is a flowchart illustrating a routine of the measurement process. When the power switch (not shown) of the measurement device 10 is turned on to supply power to the units of the measurement device 1C, the measurement device 10 repeatedly performs the measurement process illustrated in FIG. 11.

The obtaining unit 32 obtains the multiple simultaneously-captured images S (the captured image S1 and the captured image S2) corresponding to the respective multiple photoelectric areas (the photoelectric area 16A1 and the photoelectric area 16A2) and the image capture angles of the reflecting units 18 at each of which one of the multiple captured images S is captured (Step S100).

Thereafter, the selection unit 4C selects, from the multiple captured images S obtained at Step S100, the two captured images S in each of which the measurement subject P is captured (Step S102).

Thereafter, the first calculation unit 44 calculates the 2D measurement area 60 corresponding to the two captured images S selected at Step S1C2 in the real space from the image capture angles corresponding to the respective two captured images S (Step S104).

Thereafter, the second calculation unit 46 calculates the second position of the measurement subject P in the measurement area 60 from the first positions of the measurement subject P in the respective two captured images S selected at Step S102 and the corresponding image capture angles (Step S106).

Thereafter, the third calculation unit 48 calculates the position of the measurement subject P in the 3D space from the second position calculated at Step S106 and the third position calculated from the selected two captured images S (Step S108).

The output unit 50 outputs information indicating the position of the measurement subject P in the 3D space calculated at Step S108 to the projection apparatus 12 (Step S110). Then the routine ends.

As described above, the measurement device 10 according to the embodiment includes the image capturing unit 16, the multiple reflecting units 18, the changing units 20, the light condensing unit 22, the obtaining unit 32, the selection unit 40, and the calculation unit 42. The image capturing unit 16 including the photoelectric unit 16A, which photoelectrically converts incident light, captures multiple images simultaneously. The multiple reflecting units 18 are arranged at different positions. Each of the reflecting units 18 is positioned to reflect light traveling from the projection area T between the projection surface 1, on which a projection image is to be projected, and the measurement device 10. The changing units 20 are arranged for the respective multiple reflecting units 18. Each of the changing units 20 periodically changes the image capture angle between the normal to the reflecting surface G of the reflecting unit 18 and the projection surface 1. The light condensing unit 22 condenses each of reflected light beams reflected off the different reflecting units 18 to a corresponding one of the different photoelectric areas of the photoelectric unit 16A.

The obtaining unit 32 obtains the multiple captured images S corresponding to the respective multiple photoelectric areas (the photoelectric area 16A1 and the photoelectric area 16A2) and image capture angles of the reflecting units 18 at each of which one of the multiple captured images S is captured. The selection unit 40 selects, from the multiple captured images S, the two captured images S in each of which the measurement subject P is captured. The calculation unit 42 calculates the position of the measurement subject P in the 3D space based on the selected two captured images S and the image capture angles corresponding to the respective two captured images S.

Thus, in the measurement device 10 according to the embodiment, the single image capturing unit 16 simultaneously captures the multiple captured images S, in each of which the measurement subject P is captured, from different image capture directions. The measurement device 10 calculates the position of the measurement subject P in the 3D space using image capture angles of the respective captured images S.

Accordingly, even when the measurement device 10 is installed close to the projection surface 1, the measurement device 10 can measure the position in the 3D space of the measurement subject P (e.g., a hand) that is placed in an area containing at least the projection area T between the projection surface 1 and the measurement device 10.

Hence, the measurement device 10 according to the embodiment is mountable on the projection apparatus 12 which employs a short-focal-length lens as its projection lens.

In the measurement device 10 according to the embodiment, the changing unit 20 periodically causes the reflecting unit 18 to pivot, thereby periodically changing the image capture direction (in the directions indicated by the arrow B in FIG. 5).

Accordingly, the image capturing unit 16 of the measurement device 10 is capable of capturing images of areas which depend on respective image capture angles of the reflecting units 18 in the real space.

In the measurement device 10 according to the embodiment, the reflecting surfaces G of the reflecting units 18 are flat to regularly reflect incident light (see the light beams L in FIG. 4). Because a flattening process can be applied easily, the reflecting units 18 can be obtained easily by a simple manufacturing process.

First Modification

In the embodiment described above, the changing unit 20 periodically changes the image capture direction by periodically causing the reflecting unit 18 to pivot. The changing unit 20 may alternatively be modified so as to periodically change the image capture direction by periodically rotating the reflecting unit 18. To apply this first modification, the reflecting unit 18 is preferably configured to include the reflecting surfaces G on both its front and back sides.

Figure 12:
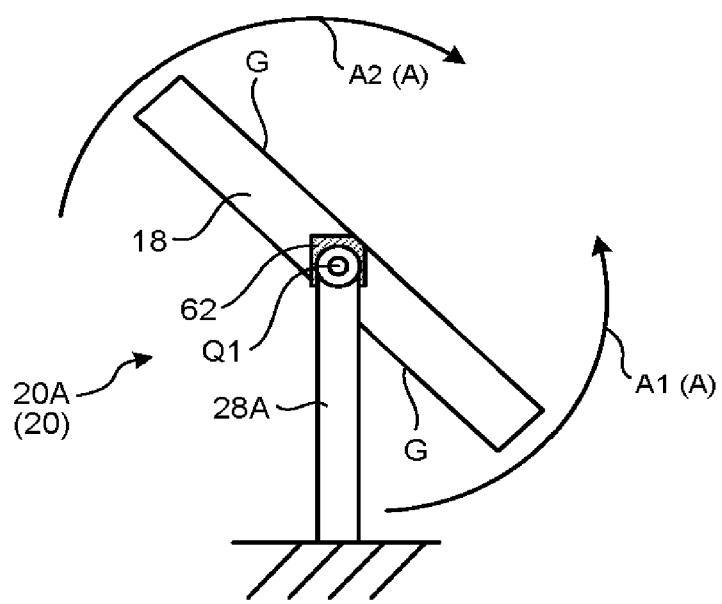
FIG. 12 is an explanatory diagram of a mechanism for changing an image capture angle of a first modification of the embodiment.

FIG. 12 is an explanatory diagram of a mechanism for changing, by the changing unit 20 of the first modification, the image capture angle. In the first modification, the changing unit 20A serving as the changing unit 20 includes a support 28A and a drive unit 62. The measurement device 10 of the first modification is identical in configuration to the measurement device 10 according to the embodiment except for including the changing unit 20A in lieu of the changing unit 20. In the first modification, the reflecting unit 18 includes the two reflecting surfaces G on its opposite sides.

The support 28A supports the reflecting unit 18 in a manner that allows the reflecting unit 18 to rotate in the directions (in the directions indicated by the arrows A (A1 or A2) in FIG. 12) intersecting the reflecting surface G. The support 28A supports the reflecting unit 18 at a position where the reflecting unit 18 can rotate on a rotation axis extending parallel to the reflecting surface G through the center Q1 of the reflecting surface G. The rotation axis of the reflecting unit 18 does not necessarily pass through the center Q1 of the reflecting surface G.

The drive unit 62 is arranged on one end, on the side of the reflecting surface G, of the support 28A. The drive unit 62 periodically drives the reflecting unit 18 to rotate on the rotation axis. By driving the reflecting unit 18 in this manner, the drive unit 62 causes the reflecting unit 18 to periodically rotate in the direction (the direction indicated by the arrows A in FIG. 12) intersecting the reflecting surface G.

Accordingly, the first modification provides, in addition to the advantage provided by the embodiment, an advantage that the image capture direction of the reflecting unit 18 can be periodically changed with a simple structure.

Second Modification

In the measurement device 10 according to the embodiment, the reflecting surface G of the reflecting unit 18 is flat to regularly reflect incident light. The reflecting surface G of the reflecting unit 18 may alternatively be concaved so as to condense incident light through the light condensing unit 22 to a size that allows the incident light to be projected within the photoelectric area of the image capturing unit 16.

Figure 13:
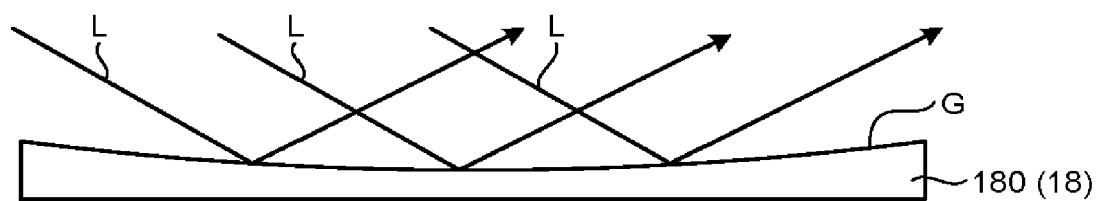
FIG. 13 is an explanatory diagram of a reflecting unit of a second modification of the embodiment.

FIG. 13 is an explanatory diagram of a reflecting unit 180 which includes the reflecting surface G that is concaved. In other words, the measurement device 10 is modified to include the reflecting unit 180 including the concaved reflecting surface G in lieu of the reflecting unit 18 (FIG. 2).

To apply this second modification, the drive unit 24 may preferably output the angles described below as the image capture angle between the normal to the reflecting surface G of the reflecting unit 18 and the light-receiving surface of the photoelectric unit 16A of the image capturing unit 16. The angles are these between each of the normals to the curved surface of the concaved reflecting unit 180 at opposite ends of a portion which reflects a to-be-captured area and the light-receiving surface of the photoelectric unit 16A to the control unit 30. More specifically, calculation can be performed so long as the to-be-captured area, which is to be captured by the image capturing unit 16, is an area corresponding to respective angles of planes, each of which is orthogonal to one of osculating planes of the reflecting surface G at points which reflect light to boundaries of the to-be-captured area. Alternatively, so long as the to-be-captured area is calculated in advance and the to-be-captured area can be defined only by a single representative angle (e.g., an angle of the back side of the reflecting unit 180), the single representative angle may be output as the image capture angle.

When the reflecting surfaces G are concaved, even if an area, light beams from which are condensed to photoelectric areas of the image capturing unit 16 corresponding to the respective reflecting units 180, in the real space is any area in the projection area T (more specifically, an area close to the projection surface 1 or an area distant from the projection surface 1), the light beams are condensed to a constant size on the corresponding photoelectric areas. Accordingly, the second modification provides, in addition to the advantage provided by the embodiment, an advantage that the position of the measurement subject P in the 3D space can be calculated accurately without causing the control unit 30 to perform complicated calculation.

Third Modification

The reflecting surface G of the reflecting unit 18 may be shaped so as to decrease the reflection angle of incident light from one end to the other end of the reflecting surface G. More specifically, the entire reflecting surface G of the reflecting unit 18 may have a moderate convex shape. Alternatively, a part of the reflecting surface G may have a convex shape.

Figure 14:
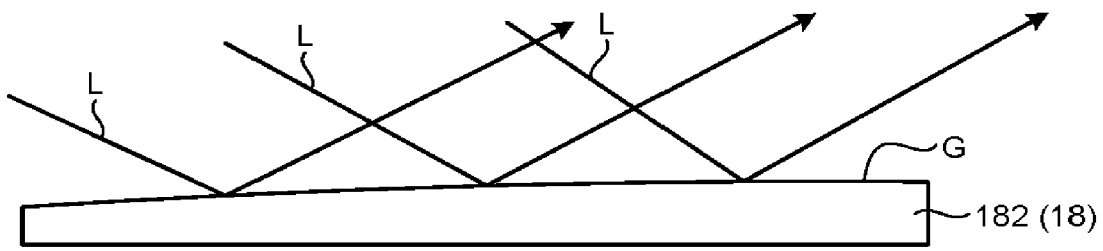
FIG. 14 is an explanatory diagram of a reflecting unit of a third modification of the embodiment.

FIG. 14 is an explanatory diagram of a reflecting unit 182 which includes the reflecting surface G of this third modification. In other words, the measurement device 10 may be configured to include the reflecting unit 182 in lieu of the reflecting unit 18 (FIG. 2).

To apply the third modification, the reflecting surface G of the reflecting unit 182 may preferably be shaped so that the thickness of the reflecting unit 182 gradually increases from one end to the other end of the reflecting surface G as illustrated in the cross section of FIG. 14 of the reflecting unit 182. The thickness may increase like a logarithmic plot, for example.

To apply the third modification, the drive unit 24 may preferably output, as the image capture angle, angles between each of the normals to the curved surface of the reflecting unit 182 at opposite ends of a portion which reflects a to-be-captured area and the light-receiving surface of the photoelectric unit 16A of the image capturing unit 16 to the control unit 30.

Employing the reflecting units 182 as the reflecting units 18 makes an area, the light beams from which are condensed to photoelectric areas of the image capturing unit 16 corresponding to the respective reflecting units 182 in the image capturing unit 16, larger than that in the configuration employing the reflecting unit 18. Accordingly, the third modification provides, in addition to the advantage provided by the embodiment, an advantage that the position of the measurement subject P can be measured in a larger area in the 3D space. Furthermore, employing the reflecting units 182 provides an advantage that the position of the measurement subject P in the 3D space can be calculated faster than in the configuration employing the reflecting units 18.

Fourth Modification

In the embodiment, it is assumed that the single reflecting unit 18 includes the single reflecting surface G. Alternatively, the single reflecting unit 18 may include multiple reflecting surfaces as the reflecting surfaces G so that the reflecting unit 18 can reflect light beams traveling from different multiple areas in the projection area T.

Figure 15:
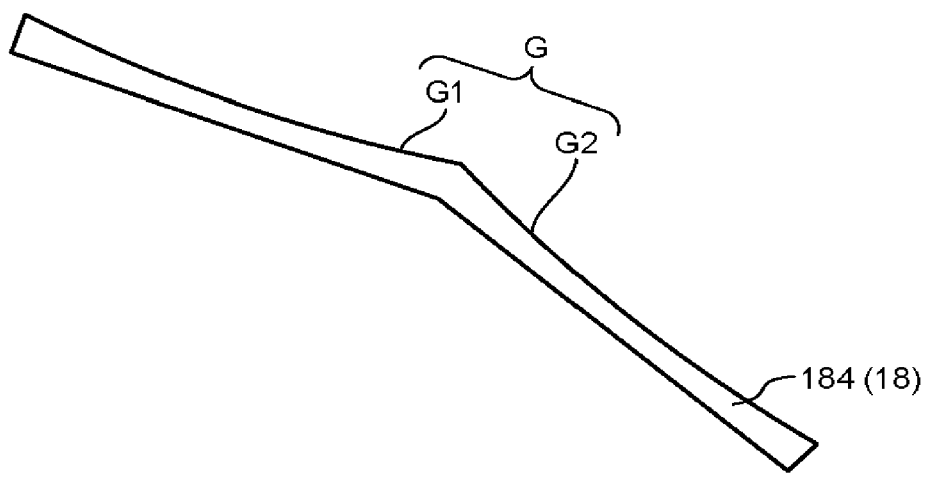
FIG. 15 is an explanatory diagram of a reflecting unit of a fourth modification of the embodiment.

FIG. 15 is an explanatory diagram of a reflecting unit 184 which includes the multiple reflecting surfaces G. In other words, the measurement device 1C may be configured to include the reflecting unit 184 in lieu of the reflecting unit 18 (FIG. 2).

The reflecting unit 184 illustrated in FIG. 15 includes two reflecting surfaces (a reflecting surface G1 and a reflecting surface G2) as the reflecting surfaces G. The number of the reflecting surfaces G included in the reflecting unit 184 is not limited to two but can be any number larger than one. In short, the reflecting unit 184 may include three reflecting surfaces as the reflecting surfaces G. Further alternatively, the reflecting unit 184 may include four reflecting surfaces as the reflecting surfaces G.

To apply this fourth modification, the drive unit 24 may preferably output, as the image capture angle, multiple reflection angles corresponding to the respective multiple reflecting surfaces G of the reflecting unit 184 to the control unit 30. The control unit 30 can locate the measurement subject P in the real space by calculating the position of the measurement subject P using an angle corresponding to an area, which is one of areas corresponding to the multiple reflection angles, where the measurement subject P is captured. Meanwhile, a representative angle may alternatively be used as in the second modification.

Employing the reflecting units 184 as the reflecting units 18 allows the image capturing unit 16 to obtain a larger number of the captured images S by a single operation by the changing unit 20 of causing the reflecting unit 184 to pivot or rotate. Accordingly, the fourth modification provides, in addition to the advantage provided by the embodiment, an advantage by virtue of the reflecting unit 184 that the position of the measurement subject P in the 3D space can be calculated faster.

Fifth Modification

Figure 16:
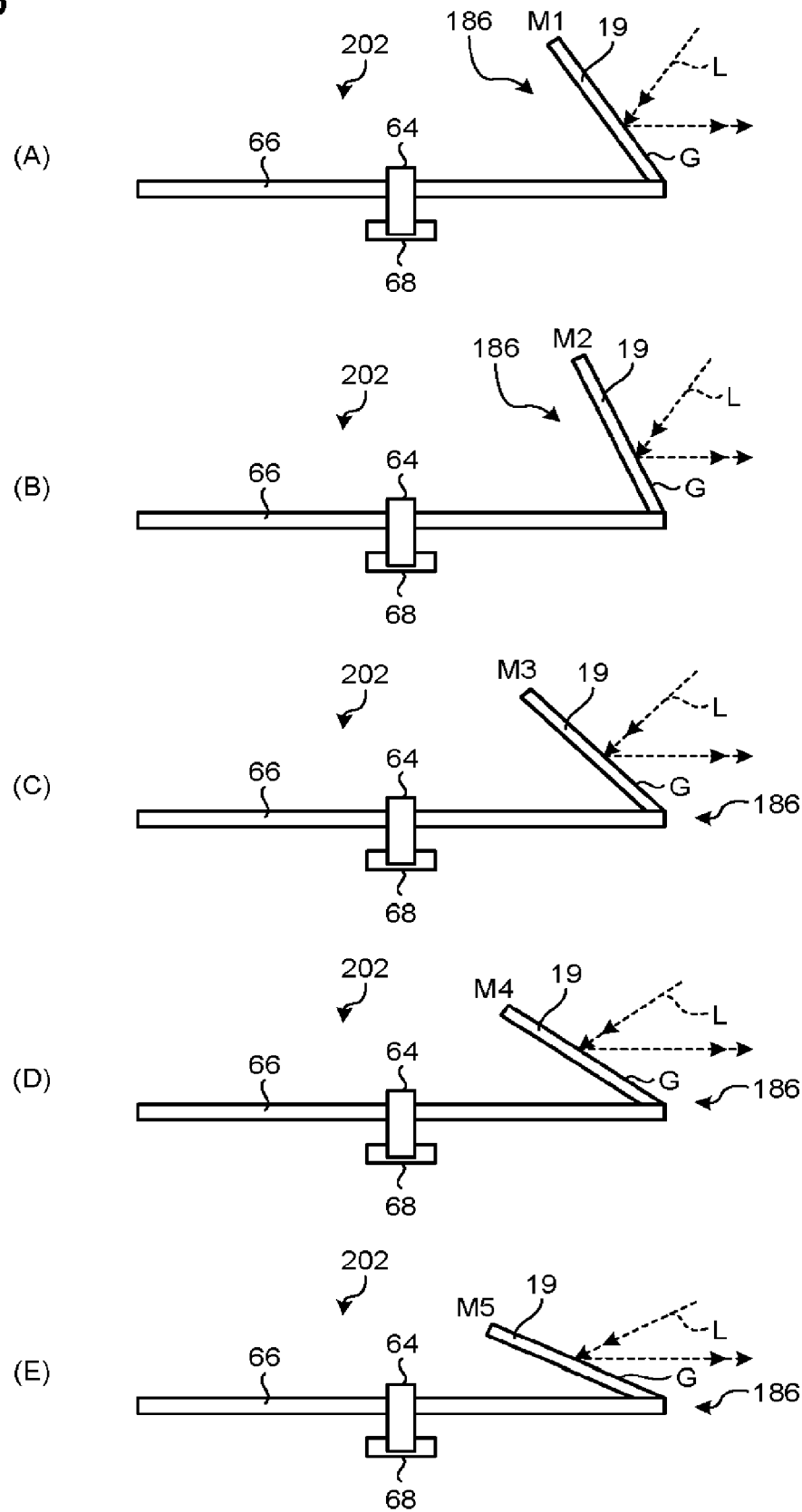
FIG. 16 that includes parts (A) to (E) is explanatory diagram of a reflecting unit of a fifth modification of the embodiment.

The reflecting unit 18 may be configured as a reflecting unit 186 made up of multiple members. FIG. 16 that includes parts (A) to (E) is explanatory diagram of the reflecting unit 186.

The reflecting unit 186 includes a plate member 66 and multiple mirror members 19. The plate member 66 may be a disc-like member, for example. The mirror member 19 has a structure similar to that of the reflecting unit 18 and includes the reflecting surface G. More specifically, the mirror member 19 is a member including a mirror surface as the reflecting surface G.

The multiple mirror members 19 are arranged along an outer edge of a plate surface of the plate member 66. The multiple mirror members 19 have different tilt angles relative to the plate surface. Each of the mirror members 19 is arranged with its reflecting surface G on the outer side.

To apply this fifth modification, the measurement device 10 may preferably include a changing unit 202 in lieu of the changing unit 20. The changing unit 202 includes a support 64 configured to support the plate member 66 in a manner that allows the plate member 66 to pivot and a drive unit 68 which causes the plate member 66 to pivot via the support 64.

The drive unit 68 causes the plate member 66 to pivot on the support 64 serving as a pivot axis, thereby changing the mirror member 19 that reflects the light beams L traveling from the projection area T from one of the multiple mirror members 19 to another. The changing unit 202 periodically changes the image capture angle in this manner.

More specifically, the drive unit 68 changes the mirror member 19 that reflects the light beams L traveling from the projection area T (which is not shown in parts (A) to (E) of FIG. 16) from a mirror member M1, which is one of the mirror members 19, to a mirror member M2, then to a mirror member M3, then to a mirror member M4, and to a mirror member M5 as illustrated in parts (A) to (E) of FIG. 16 by driving and causing the plate member 66 to pivot via the support 64. The changing unit 202 periodically changes the image capture angle by driving and causing the plate member 66 to pivot in this manner.

Alternatively, the plate member 66 may be driven to rotate.

Figure 17:
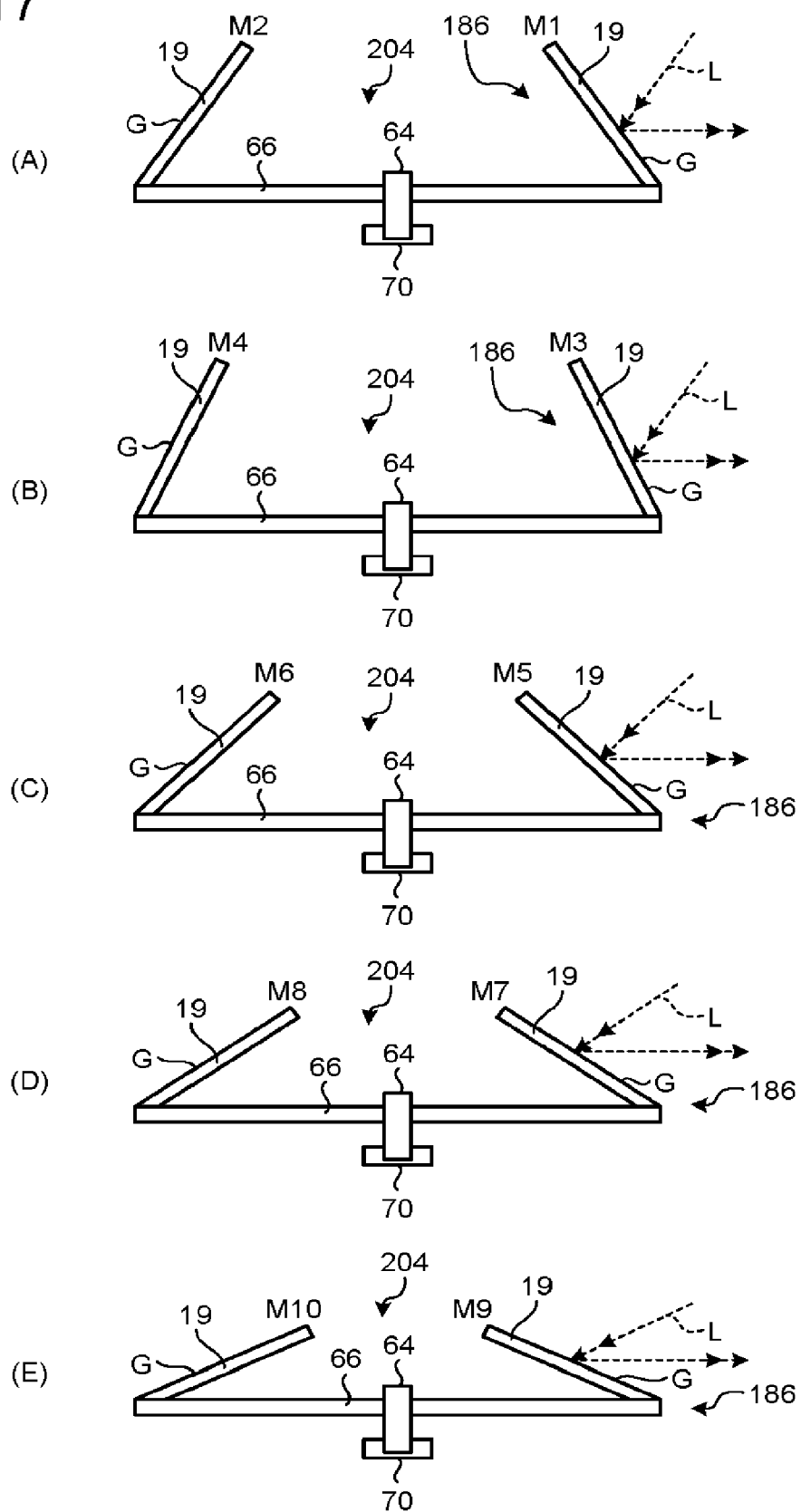
FIG. 17 that includes parts (A) to (E) is explanatory diagram of a reflecting unit of the fifth modification.

FIG. 17 that includes parts (A) to (E) is explanatory diagram of a configuration in which the plate member 66 is driven to rotate.

To apply this configuration, the measurement device 10 may preferably include a changing unit 204 in lieu of the changing unit 20. The changing unit 204 includes the support 64 configured to support the plate member 66 in a manner that allows the plate member 66 to rotate and a drive unit 70 which rotates the plate member 66 via the support 64.

The drive unit 70 changes the mirror member 19 that reflects the light beams L traveling from the projection area T from one of the multiple mirror members 19 to another by rotating the plate member 66 on the support 64 serving as a rotation axis. The changing unit 204 periodically changes the image capture angle in this manner.

To apply this configuration, the multiple mirror members 19 may preferably be arranged along the outer edge of the plate surface of the plate member 66 so that each pair of the mirror members 19 having a same tilt angle is arranged in symmetry with respect to the support 64.

More specifically, as illustrated in parts (A) to (E) of FIG. 17, the drive unit 70 changes the mirror member 19 that reflects the light beams L traveling from the projection area T (which is not shown in FIG. 17) from the mirror member M1, to the mirror member M3, then to the mirror member M5, then to a mirror member M7, and to a mirror member M9, or from the mirror member M2, to the mirror member M4, then to a mirror member M6, then to a mirror member M8, and to a mirror member M10 by driving the plate member 66 to rotate via the support 64. The changing unit 204 periodically changes the image capture angle by driving the plate member 66 to rotate in this manner.

As described above, in the fifth modification, the reflecting unit 186 is made up of the plate member 66 and the multiple mirror members 19. The multiple mirror members 19 having different tilt angles relative to the plate surface are arranged along the outer edge of the plate surface of the plate member 66. The plate member 66 is driven to rotate or pivot.

Thus, the fifth modification which allows maintaining the angles of the mirror members 19 constant provides, in addition to the advantage provided by the embodiment, an advantage that the position of the measurement subject P in the 3D space can be calculated more accurately.

Sixth Modification

The first calculation unit 44 according to the embodiment calculates the 2D measurement area 60 in the real space corresponding to the two captured images S selected by the selection unit 40 using the image capture angles which correspond to the respective two captured images S. Alternatively, the first calculation unit 44 may calculate the 2D measurement area 60 by a method other than that described above.

For example, the 2D measurement area 60 may be calculated as follows. The first calculation unit 44 stores area information in which combinations of two image capture angles and candidate areas of the measurement area 60 are associated with each other in a memory (not shown) in advance. The area information may alternatively be stored in the storage unit 34.

Figure 18:
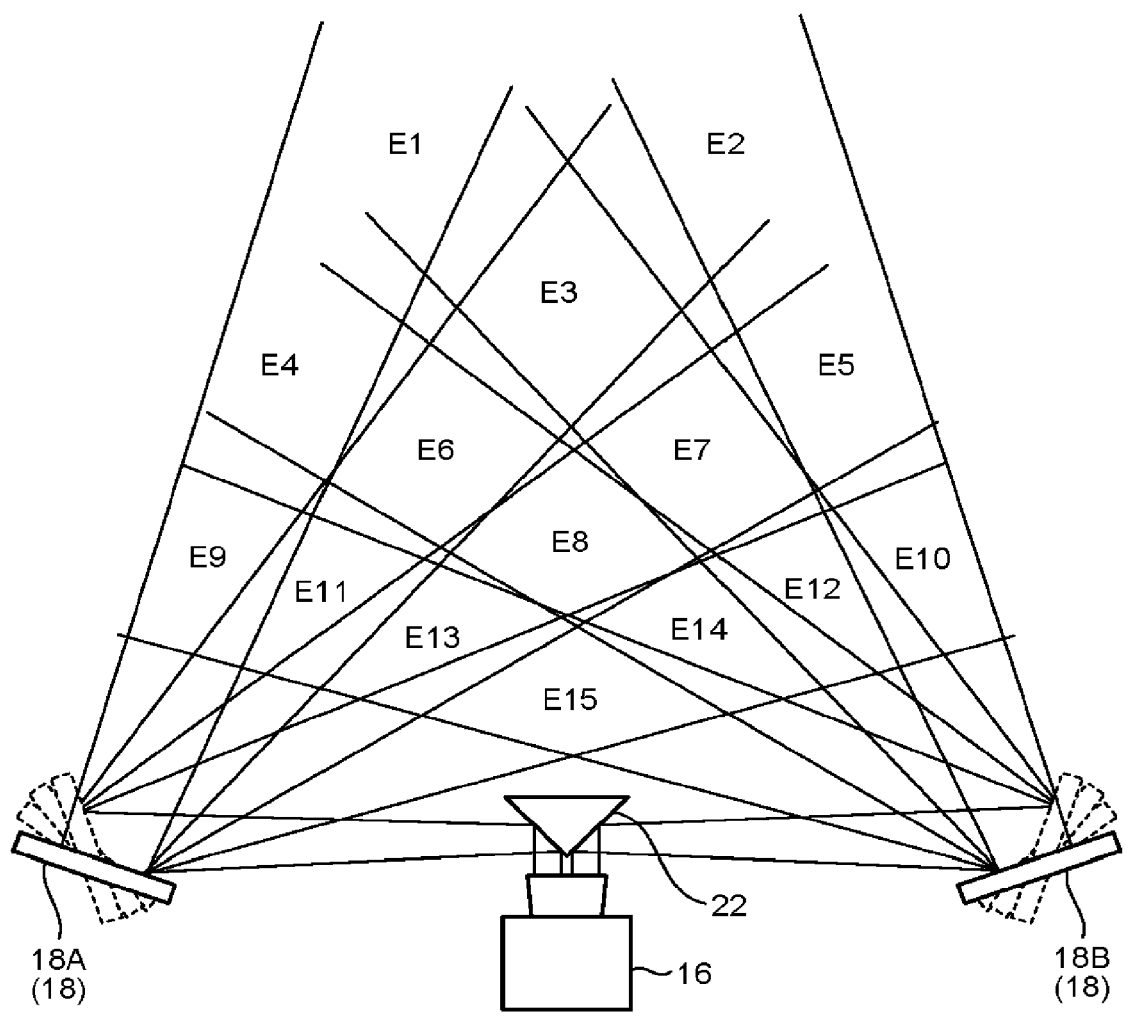
FIG. 18 is an explanatory diagram of area information in a sixth modification of the embodiment.

FIG. 18 is an explanatory diagram of the area information. The first calculation unit 44 calculates, for example, information indicating candidate areas E1 to E15 each defined by a combination of the image capture angle of the reflecting unit 18A and the image capture angle of the reflecting unit 18B for the measurement area 60. The first calculation unit 44 stores the area information in which the combinations of the two image capture angles and the calculated corresponding candidate areas (E1 to E15) are associated with each other in the memory (not shown).

When the two captured images S are selected by the selection unit 40, the first calculation unit 44 calculates the measurement area 60 by reading out the measurement area 60 (which is any one of the candidate areas E1 to E15) associated with a combination of image capture angles corresponding to the selected two captured images S from the area information.

The candidate areas (E1 to E15) to be stored in the area information in advance are not limited to the 15 candidate areas illustrated in FIG. 18 but may be subareas obtained by further dividing the 15 areas.

The first calculation unit 44 may store the area information with representative values of the candidate areas (E1 to E15) further associated therewith. When such representative values are associated with the area information, the second calculation unit 46 may calculate, as the second position of the measurement area 60, one of the representative values that is associated with the combination of the image capture angles corresponding to the respective two captured images S selected by the selection unit 40.

When the first calculation unit 44 calculates the measurement area 60 using the calculation method of the sixth modification as described above, in addition to the advantage provided by the embodiment, an advantage that the position of the measurement subject P in the 3D space can be calculated faster is provided.

Hardware Configuration

Figure 19:
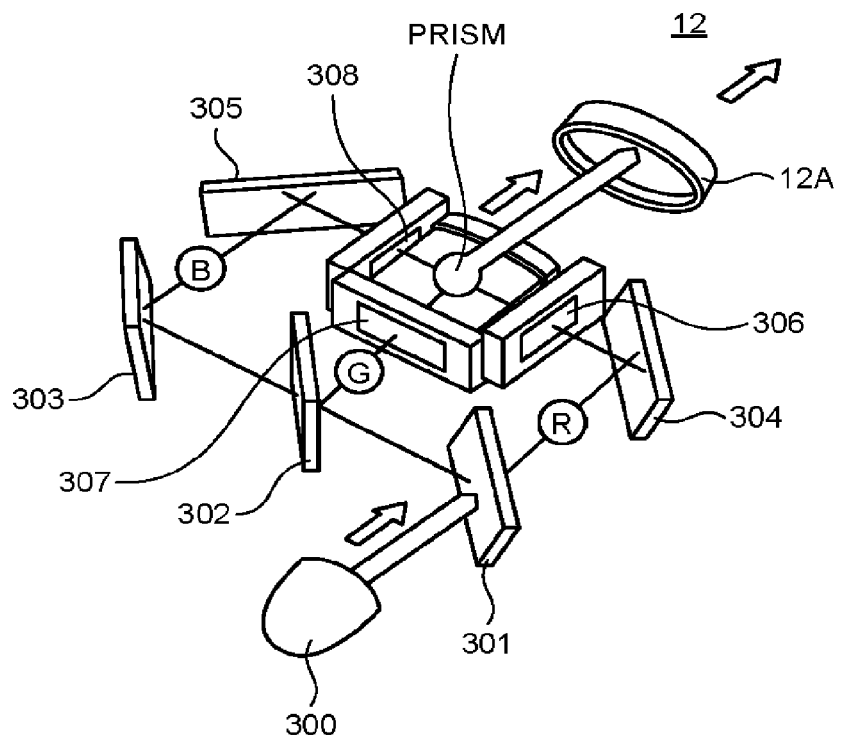
FIG. 19 is a schematic diagram illustrating an example hardware configuration of the projection apparatus.

FIG. 19 is a schematic diagram illustrating an example hardware configuration of the projection apparatus 12 of each of the embodiment and the modifications. FIG. 19 illustrates an example in which a three-LCD (liquid crystal display) system is applied to the projection apparatus 12.

The projection apparatus 12 displays a projection image on each of an LCD 306 for red, an LCD 307 for green, and an LCD 308 for blue. The projection apparatus 12 irradiates the LCD 306 for red with red light out of light emitted from a lamp (a light source) 300, irradiates the LCD 307 for green with green light out of the light, and irradiates the LCD 308 for blue with blue light out of the light using a dichroic mirror 301 which allows red light to pass through, a dichroic mirror 302 which allows green light to pass through, a dichroic mirror 303 which allows blue light to pass through, and mirrors 304 and 305. The red light, the green light, and the blue light passed through the LCDs 306 to 308 are combined by a prism. The projection unit 12A projects the combined light, thereby projecting a projection image on the projection surface 1. The projection unit 12A is the short-focal-length lens as described earlier.

Figure 20:
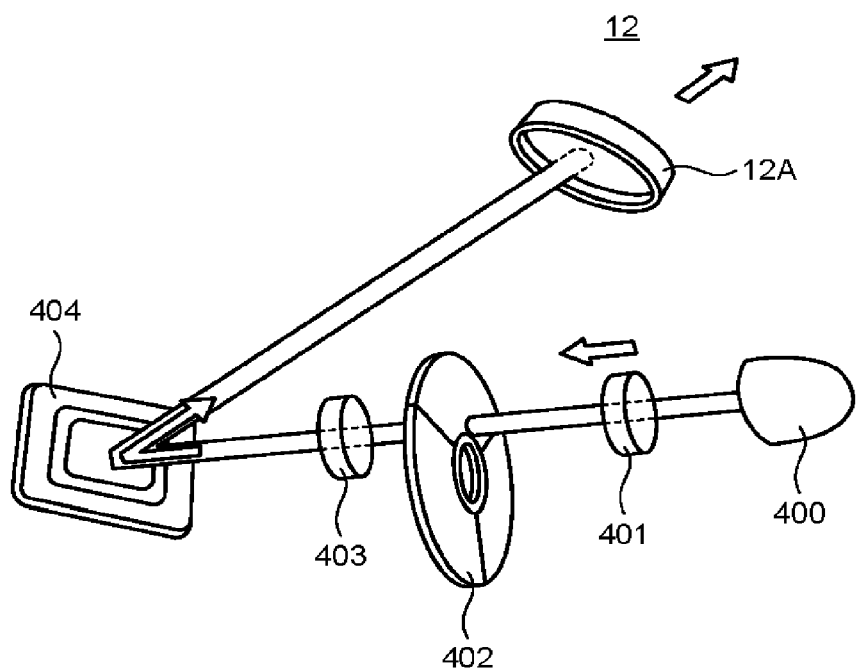
FIG. 20 is another schematic diagram illustrating another example hardware configuration of the projection apparatus.

Meanwhile, the projection apparatus 12 is not limited to the three-LCD system. Alternatively, for example, the projection apparatus 12 may employ such a DLP (digital light processing) system as that illustrated in FIG. 20. In the DLP system, light emitted from a lamp 400 transmits through a lens 401 and a color wheel 402 with red, green, and blue sections, and a lens 403. The transmitted light is then reflected off a DLP chip 404. The reflected light is projected from the projection unit 12A. As a result, a projection image is projected on the projection surface 1. The projection unit 12A is the short-focal-length lens as described earlier.

Each of the measurement device 1C and the projection apparatus 12 of each of the embodiment and the modifications includes a control device such as a CPU, a storage device such as a ROM and a RAM, an external storage device such as a HDD or an SSD, an input device such as a key switch, and a communication I/F such as an NIC (network interface controller), and can be implemented by a hardware configuration utilizing a typical computer.

Program instructions to be executed by the measurement device 10 and the projection apparatus 12 of each of the embodiment and the modifications are provided as being recorded in a non-transitory tangible computer-readable storage medium as a file in an installable format or an executable format. The computer-readable storage medium can be a CD-ROM, a CD-R, a memory card, a DVD (digital versatile disk), a flexible disk (FD), or the like.

The program instructions to be executed by the measurement device 10 and the projection apparatus 12 of each of the embodiment and the modifications may be stored in a computer connected to a network such as the Internet and provided by being downloaded from the computer over the network. The program instructions to be executed by the measurement device 10 and the projection apparatus 12 of each of the embodiment and the modifications may be provided or distributed over a network such as the Internet. The program instructions to be executed by the measurement device 10 and the projection apparatus 12 of each of the embodiment and the modifications may be provided as being stored in the ROM or the like in advance.

The program instructions to be executed by the measurement device 10 and the projection apparatus 12 of each of the embodiment and the modifications are configured in modules for implementing the units described above on a computer. From the viewpoint of actual hardware, the control device reads out the program instructions from the storage device, loads them, and executes the program instructions, thereby implementing the units on the computer.

According to an aspect of the present invention, a measurement device can be mounted on a projection apparatus which employs a short-focal-length lens as its projection lens.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A measurement device comprising:
   an image capturing unit including a photoelectric unit and configured to capture multiple images corresponding to respective multiple different photoelectric areas of the photoelectric unit, the photoelectric unit photoelectrically converting incident light;
   multiple reflecting units arranged at different positions, each of the reflecting units being positioned to reflect light traveling from a projection area between a projection surface, on which a projection image is to be projected, and the measurement device off a reflecting surface of the reflecting unit;
   changing units, each of the changing units being provided for one reflecting unit of the multiple reflecting units and configured to change an image capture angle of the one reflecting unit;
   a light condensing unit configured to condense each of reflected light beams reflected off the different reflecting units to a corresponding one of the different photoelectric areas of the photoelectric unit;
   an obtaining unit configured to obtain the multiple captured images corresponding to the respective multiple photoelectric areas and image capture angles of the reflecting units, each of the image capture angles being an angle at which one of the captured images is captured;
   a selection unit configured to select, from the multiple captured images, two or more images in each of which a measurement subject is captured; and
   a calculation unit configured to calculate a position of the measurement subject in a 3D space based on the selected two or more captured images and the image capture angles corresponding to the respective two or more captured images.

2. The measurement device according to claim 1, wherein the changing unit periodically changes the image capture angle of the reflecting unit.

3. The measurement device according to claim 1, wherein the changing unit changes the image capture angle of the reflecting unit in a manner to trace the measurement subject.

4. The measurement device according to claim 1, wherein the changing unit includes
   a support configured to support the reflecting unit in a manner that allows the reflecting unit to pivot in a direction intersecting the reflecting surface and
   a drive unit configured to cause the reflecting unit to pivot.

5. The measurement device according to claim 1, wherein the changing unit includes
   a support configured to support the reflecting unit in a manner that allows the reflecting unit to rotate in a direction intersecting the reflecting surface and
   a drive unit configured to rotate the reflecting unit.

6. The measurement device according to claim 1, wherein the reflecting unit includes
   a plate member and
   multiple mirror members arranged along an outer edge of a plate surface of the plate member and having different tilt angles with respect to the plate surface, each of the mirror members having a mirror surface serving as the reflecting surface, and the changing unit includes
- a support configured to support the plate member in a manner that allows the plate member to rotate and
- a drive unit configured to rotate the plate member.

7. The measurement device according to claim 1, wherein the reflecting surface is flat to regularly reflect incident light.

8. The measurement device according to claim 1, wherein the reflecting surface is concaved so as to condense incident light through the light condensing unit to a size that allows the incident light to be projected within the photoelectric area.

9. The measurement device according to claim 1, wherein the reflecting surface is shaped so as to decrease a reflection angle of incident light from one end to the other end of the reflecting surface.

10. The measurement device according to claim 1, wherein the reflecting unit includes multiple reflecting surfaces configured to reflect light beams traveling from different multiple areas in the projection area.

11. The measurement device according to claim 1, wherein the calculation unit includes
- a first calculation unit configured to calculate a 2D measurement area in real space corresponding to the selected two or more captured images using the image capture angles corresponding to the respective two or more captured images,
- a second calculation unit configured to calculate a second position of the measurement subject in the measurement area from first positions of the measurement subject in the respective two or more captured images and the image capture angles, and
- a third calculation unit configured to calculate the position of the measurement subject in the 3D space from the second position and a third position of the measurement subject, the third position being a position of the measurement subject in a direction orthogonal to the measurement area.

12. The measurement device according to claim 11, wherein the first calculation unit calculates the measurement area by reading out, from area information in which combinations of two or more image angles are associated with measurement areas, a measurement area associated with a combination of the image capture angles of the reflecting units, each of the image capture angles being an angle at which one of the selected two or more captured images is captured.

13. A projection apparatus comprising:
the measurement device according to claim 1; and
a projection unit configured to project the projection image on the projection area.

14. A measurement method to be performed by a measurement device including
an image capturing unit including a photoelectric unit and configured to capture multiple images corresponding to respective multiple different photoelectric areas of the photoelectric unit, the photoelectric unit photoelectrically converting incident light,
multiple reflecting units arranged at different positions, each of the reflecting units being positioned to reflect light traveling from a projection area between a projection surface, on which a projection image is to be projected, and the measurement device,
changing units, each of the changing units being provided for one reflecting unit of the multiple reflecting units and configured to change an image capture angle of the one reflecting unit, and
a light condensing unit configured to condense each of reflected light beams reflected off the different reflecting units to a corresponding one of the different photoelectric areas of the photoelectric unit, the measurement method comprising:
obtaining the multiple captured images corresponding to the respective multiple photoelectric areas and image capture angles of the reflecting units, each of the image capture angles being an angle at which one of the captured images is captured;
selecting, from the multiple captured images, two or more images in each of which a measurement subject is captured; and
calculating a position of the measurement subject in a 3D space based on the selected two or more captured images and the image capture angles corresponding to the respective two or more captured images.

15. A non-transitory computer-readable recording medium storing program instructions that, when executed by a computer including
an image capturing unit including a photoelectric unit and configured to capture multiple images corresponding to respective multiple different photoelectric areas of the photoelectric unit, the photoelectric unit photoelectrically converting incident light,
multiple reflecting units arranged at different positions, each of the reflecting units being positioned to reflect light traveling from a projection area between a projection surface, on which a projection image is to be projected, and the image capturing unit,
changing units, each of the changing units being provided for one reflecting unit of the multiple reflecting units and configured to change an image capture angle of the one reflecting unit, and
a light condensing unit configured to condense each of reflected light beams reflected off the different reflecting units to a corresponding one of the different photoelectric areas of the photoelectric unit, cause the computer to perform:
obtaining the multiple captured images corresponding to the respective multiple photoelectric areas and image capture angles of the reflecting units, each of the image capture angles being an angle at which one of the captured images is captured;
selecting, from the multiple captured images, two or more images in each of which a measurement subject is captured; and
calculating a position of the measurement subject in a 3D space based on the selected two or more captured images and the image capture angles corresponding to the respective two or more captured images.

* * * * *